US005784473A

United States Patent [19]

Ferren

[11] Patent Number: 5,784,473

[45] Date of Patent: Jul. 21, 1998

[54] SOUND SYSTEM

[75] Inventor: Bran Ferren, East Hampton, N.Y.

[73] Assignee: Disney Enterprises, Inc., Burbank, Calif.

[21] Appl. No.: 609,769

[22] Filed: Feb. 23, 1996

[51] Int. Cl.[6] .......... H04B 1/00

[52] U.S. Cl. .......... 381/86; 381/24; 381/90; 381/155; 381/160; 181/155; 181/156; 181/191

[58] Field of Search .......... 381/24, 77, 86, 381/90, 155, 160; 181/155, 156, 191

[56] References Cited

U.S. PATENT DOCUMENTS

| | | |
|---|---|---|
| 1,965,405 | 7/1934 | Blattner . |
| 1,988,250 | 1/1935 | Olson . |
| 4,023,566 | 5/1977 | Martinmaas . |
| 4,492,826 | 1/1985 | Chiu . |
| 4,797,934 | 1/1989 | Hufnagel . |
| 4,949,386 | 8/1990 | Hill . |
| 4,991,222 | 2/1991 | Nixdorf . |

*Primary Examiner*—Curtis A. Kuntz
*Assistant Examiner*—Duc Nguyen
*Attorney, Agent, or Firm*—Pretty, Schroeder & Poplawski

[57] ABSTRACT

This disclosure relates to a sound system that provides high quality sound notwithstanding extreme background noise. Preferably implemented in amusement ride vehicles, such as roller coasters, the present sound system mounts left and right channel sets of speakers in each seat back, one on each side of a center section that supports the passenger's back. These speakers are mounted in a wing-back relationship, such that they direct their sound away from one another and toward laterally extending arms that extend forward from the seat back, outside of the speakers. These arms mount an inward-facing spherical reflector, which reflects and disperses sound toward a range of positions associated with height variance of the passenger. Using this arrangement, all passengers will experience the same high quality sound, whatever the passenger's height. The left and right channels speakers are each coaxially-mounted, two-way speakers. Of these, the larger (rear) bass speakers share a common speaker enclosure formed within the seat back, and both of the left and right channels are driven in common for bass. A passive driver cone is mounted at the top of the speaker enclosure, to optimize bass production and move air in the vicinity of the passenger's neck, to further enhance sound. Using the preferred device, high quality sound may be provided to each passenger of the vehicle, including sophisticated special effects and music, all of which beneficially contribute to the overall ride experience.

24 Claims, 4 Drawing Sheets

FIG. 2
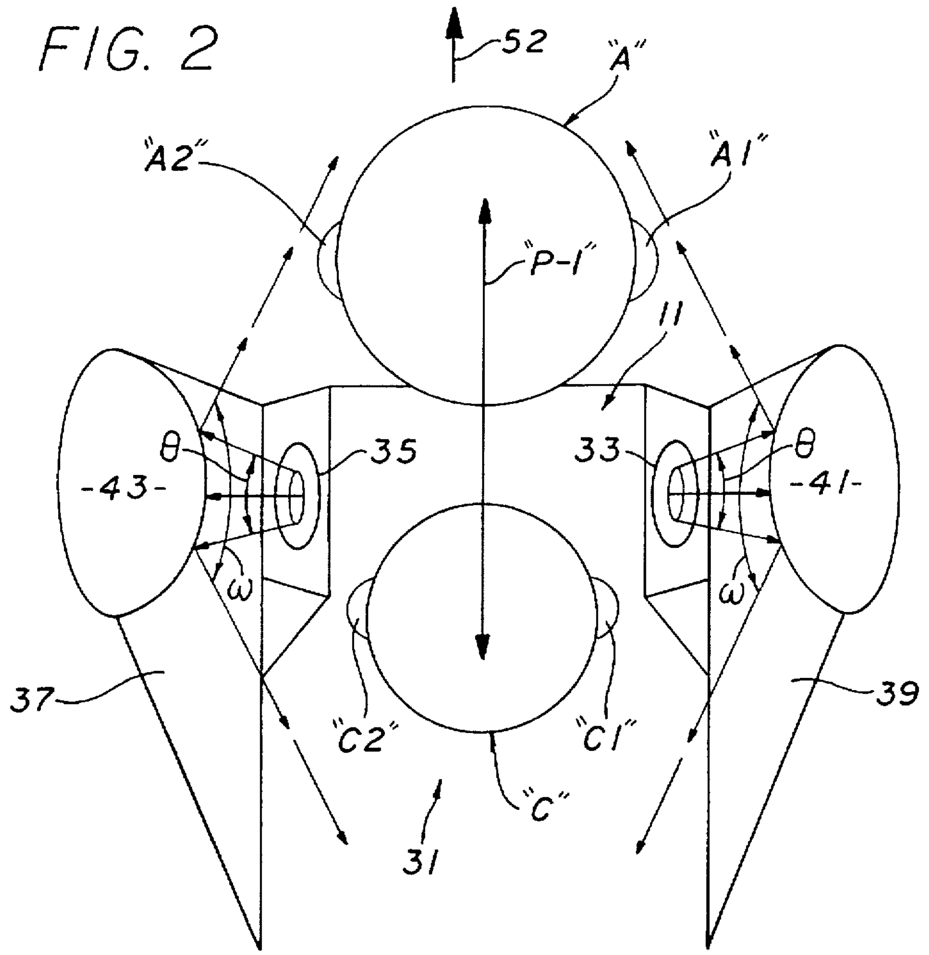
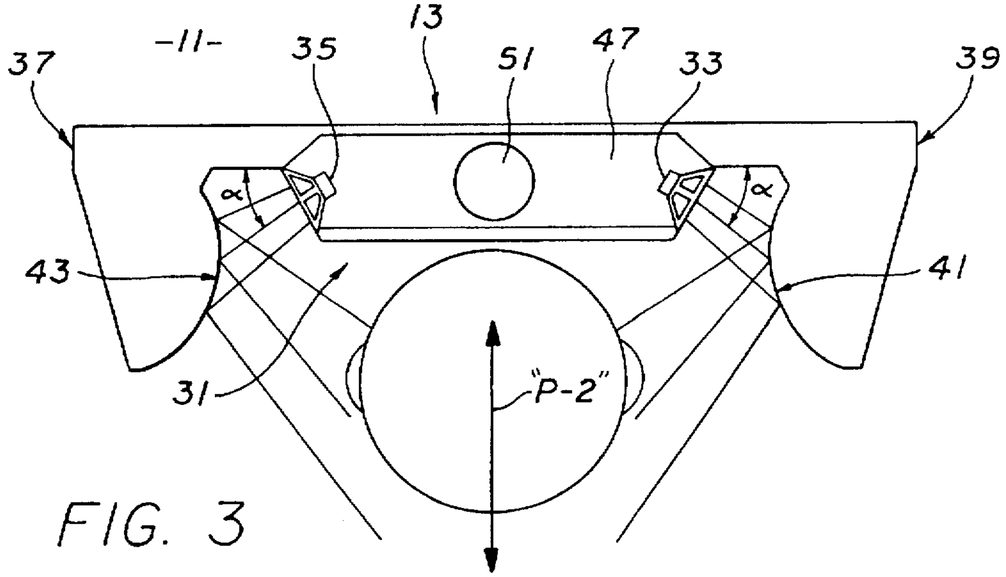
FIG. 3

SOUND SYSTEM

The present invention relates to sound systems. More particularly, it provides a sound system which is especially useful under conditions of high ambient noise, where a number of listeners are in close proximity.

BACKGROUND

Ambient noise can mask desired sounds such as music or speech, rendering them unintelligible. This problem is particularly acute if sound is to be commonly provided to a group of listeners; to enable each listener in the group to hear sounds, the volume of the sound is sometimes boosted, to make the sound loud enough to overcome the noise. Unfortunately, this solution is not always cost-efficient or desirable. Further, since noise does not mask each sound frequency equally, boosting the volume sometimes has the undesired effect of rendering other frequencies too loud. This can be particularly undesirable if some listeners are closer to the speaker or speakers than others. Consequently, in many environments, boosting the volume of desired sounds may not have the desired effect, and it may be limited by cost, available space, etc.

The problem of overcoming ambient noise is particularly severe in the case of amusement rides, such as roller coasters. As modern day amusement parks advance in their technologies, it is desired to employ more sophisticated sound effects and music. Under the conditions that many ride vehicles experience, however, ambient noise is significant, and it becomes very difficult to provide listeners in the vehicles with desired sound effects and music. In this environment, it is not practical to provide each listener with his or her own headset, because the wearing of headsets poses a safety risk. Additionally, headsets experience substantial wear and tear and are typically subject to removal. Also, since headsets generally cover the listeners' ears, the headsets may block sounds that the listener is preferably exposed to. For these reasons, speakers alone are usually relied upon, either mounted within the vehicle or external to it, to provide sound effects and music within amusement attractions.

In the past, several solutions have been tried to optimize sound intelligibility, such that the effect of sound and music upon the ride experience can be enhanced. One solution mounts individual speakers between adjacent seats, to provide each passenger or listener of the vehicle with speakers close to them. Unfortunately, each passenger within the vehicle is subject not only to the speakers upon his or her immediate left and right, but also speakers that are several passengers distant, within the same or different rows of the vehicle. Sound from these distant speakers can interfere with sound from the two speakers immediately next to the listener, detracting from the desired effect and overall sound quality. In addition, if the sound provided to the listeners is to include high quality bass sounds, each speaker typically requires its own speaker enclosure, which may not be possible in certain attractions or embodiments, given size constraints. Also, the speakers in the vehicle are typically mounted at a fixed height; consequently, a child whose ears are on a level with the speakers may experience louder sound than an adult in the same seat.

If it is desired to provide stereo sounds to the listener, the problems of providing high quality sound are worse. For example, the scheme of mounting a speaker between each passenger, just referred to, is inadequate, because left and right channel speakers have to be alternated between passengers, i.e., to provide stereo. This causes every other passenger to hear reverse stereo instead of the desired stereo; effects intended for the left side instead are perceived by every other passenger as occurring on the right side. Further, the problem of "cross-talk" between local and distant speakers is heightened, since other, distant speakers on a passenger's right or left are playing different channels of sound than the speakers on the immediate right or left of the passenger.

For these reasons, it is usually conventional in amusement rides and elsewhere to provide group stereo using left channel speakers, which are mounted only at the extreme left of the group of listeners, and right channel speakers, which are mounted only at the extreme right of the listeners. Unfortunately, listeners nearer to the left channel speakers will generally hear the left channel much more loudly than the right channel, and vice-versa for listeners nearer the right channel speakers. Listeners who are seated in the middle, while receiving equal doses of the left and right stereo channels, are somewhat distant from all of the speakers, which generally makes sound subject to masking by ambient noise.

There exists a definite need for a sound system that can be used to provide high quality sound to passengers of an amusement park attraction. Preferably, however, such a sound system should be usable not only in an amusement attraction, but in other environments as well where a group of listeners are to all commonly receive the same sounds. Further, a need exists for a sound system that provides equal levels of sound notwithstanding a variance in human height; in this manner, a listener can experience the same high quality sound no matter whether the listener is tall or short, or an adult or a child. Finally, a need exists for a sound system that can be used in a high noise environment to provide individual listeners with high quality sound, without distracting the listener from his or her environment. The present invention solves these needs and provides further, related advantages.

SUMMARY OF THE INVENTION

The present invention solves the needs mentioned above by providing a sound system that is particularly useful under conditions of high ambient noise. It overcomes the problems of providing an individual listener with a sound system dedicated only to that listener, and it provides clear sound, notwithstanding variation in the listener's dimensions. That is to say, whether the listener is tall or short, an adult or a child, clear sound can be provided to any listener observing an attraction. The present invention provides an economical and efficient sound system that is particularly useful where noise is high and multiple listeners are positioned closely together, such as in an amusement park ride.

One form of the invention provides a sound system where a human listener is of unknown dimensions. Given variance in human height and size, the listener's ears will vary within a range of positions. To provide sound to this unknown listener, notwithstanding this variance, the present invention utilizes two speakers and a sound reflector that corresponds to each ear of the listener. The sound reflectors each have a convex surface that reflects sound and diverges it toward a range of positions. This divergence causes the sound to be reflected in many different directions such that the listener, be it child or adult, hears the sound well, as though the speaker was mounted at the height of the listener, near to his or her ears.

In more particular aspects of this form of the invention, the sound system may be part of a back rest for the listener, and the speakers may be mounted within that seat or back rest to point away from each other. The sound reflectors are mounted by a support mechanism on each side of the listener, and they reflect sound directed away from the listener back toward the listener's ears. The speakers may be mounted behind the listener's head, in a wing-back relationship, to point generally away from the listener. In this manner, the listener principally receives diverged, reflected sound, not just direct sound. The support mechanism can preferably be a pair of lateral arms, which extend forward on each side of the listener's head and mount spherical reflectors to point inward, generally toward the listener. A sound system according to the invention can be applied in a theater, amusement park, or other environment where it is desired to supply individual listeners with their own stereo speakers.

A second form of the invention includes a left channel speaker, representing the left channel of stereo sound, and a right channel speaker, representing a right channel of the stereo sound. Both of these speakers are at least partially mounted in the same speaker enclosure, notwithstanding that they represent different channels. In this manner, they are arranged relative to each other to mutually reinforce production of bass. In more particular features of this second form of the invention, the speaker enclosure can be mounted within the back rest, and have a passive driver that shares the speaker enclosure with the speakers. This passive driver is configured to emit sound in a vertical direction relative to the listener, either upward or downward. In an amusement park ride, this passive driver can be used to reinforce the production of bass by creating air movement just behind the listener's head.

Additional forms of the invention provide a sound system that permits several listeners to each hear stereo sound using a speaker pair dedicated to each of them. More particularly, this form of the invention includes a back rest for each listener, each one having a central section with left and right channel speakers mounted on opposite sides of the central section. A third form of the invention uses a common speaker enclosure for both of the left channel and right channel speakers, while a fourth form of the invention uses individual sound reflectors on each side of each one of the listeners. By using convex reflectors, as mentioned, each listener may be provided with stereo sound notwithstanding variance in human height.

In more particular features of the invention, the speakers can each be a coaxially-mounted, two-way speaker, including a first, low-frequency speaker and a second, high-frequency speaker. The low-frequency speakers of the two channels share the enclosure in common, to reinforce bass, while the high-frequency speakers are mounted outside the speaker enclosure. Further, the system can be embodied in a vehicle of an amusement park ride, with seats arranged in several rows. Under high noise conditions, the reflectors permit stereo sound to be created right next to each listener, yet without generating significant interference from nearby seats.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 2 is an illustrative diagram that illustrates the sound system of the present invention as it is implemented in one of the passenger seats seen in FIG. 1B. The figure illustrates the front of one of the seats, including the location of two passengers heads, including the head of a tall adult, designated "A," and the head of a short child, designated "C."

FIG. 3 is a plan cross-sectional view of the passenger seat of FIG. 3, and illustrates the relative positioning of a passenger's head, designated "P" in FIG. 3.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the specific implementation of a sound system, in particular, one that is mounted within the seat backs of roller coasters and other amusement park vehicles.

I. Use Of The Preferred Embodiment In A Roller-Coaster

In accordance with the present invention, the preferred embodiment is a sound system 11 which is integrated into the individual seats 13 of an amusement attraction. The sound system 11 is preferably used to surmount conditions of loud background noise, and provide amusement park guests with effective high quality sound, including sophisticated stereo, special effects and music.

Figure 1A:
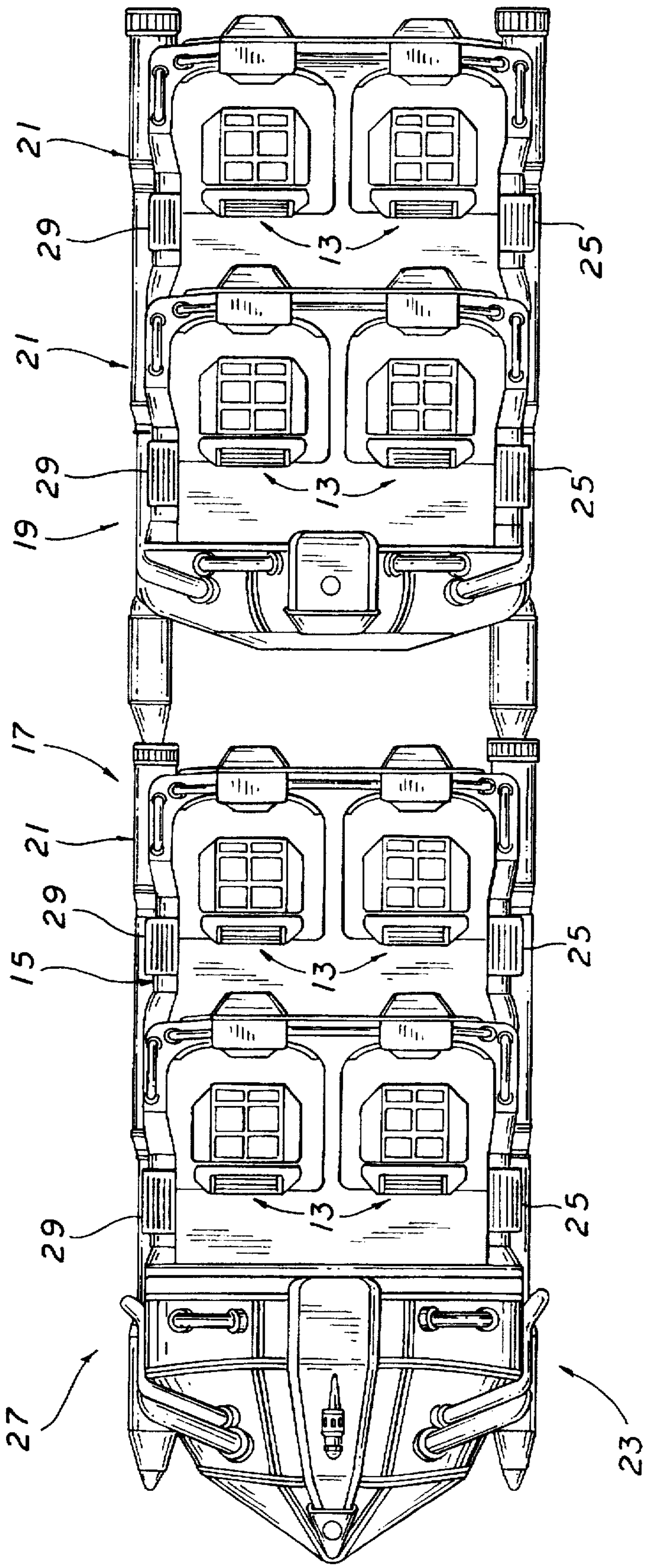
FIG. 1A is a plan view of an amusement attraction ride vehicle, which helps illustrate the preferred use of the preferred embodiment; the vehicle has four passenger rows, each of which has side-by-side seats.
Figure 1B:
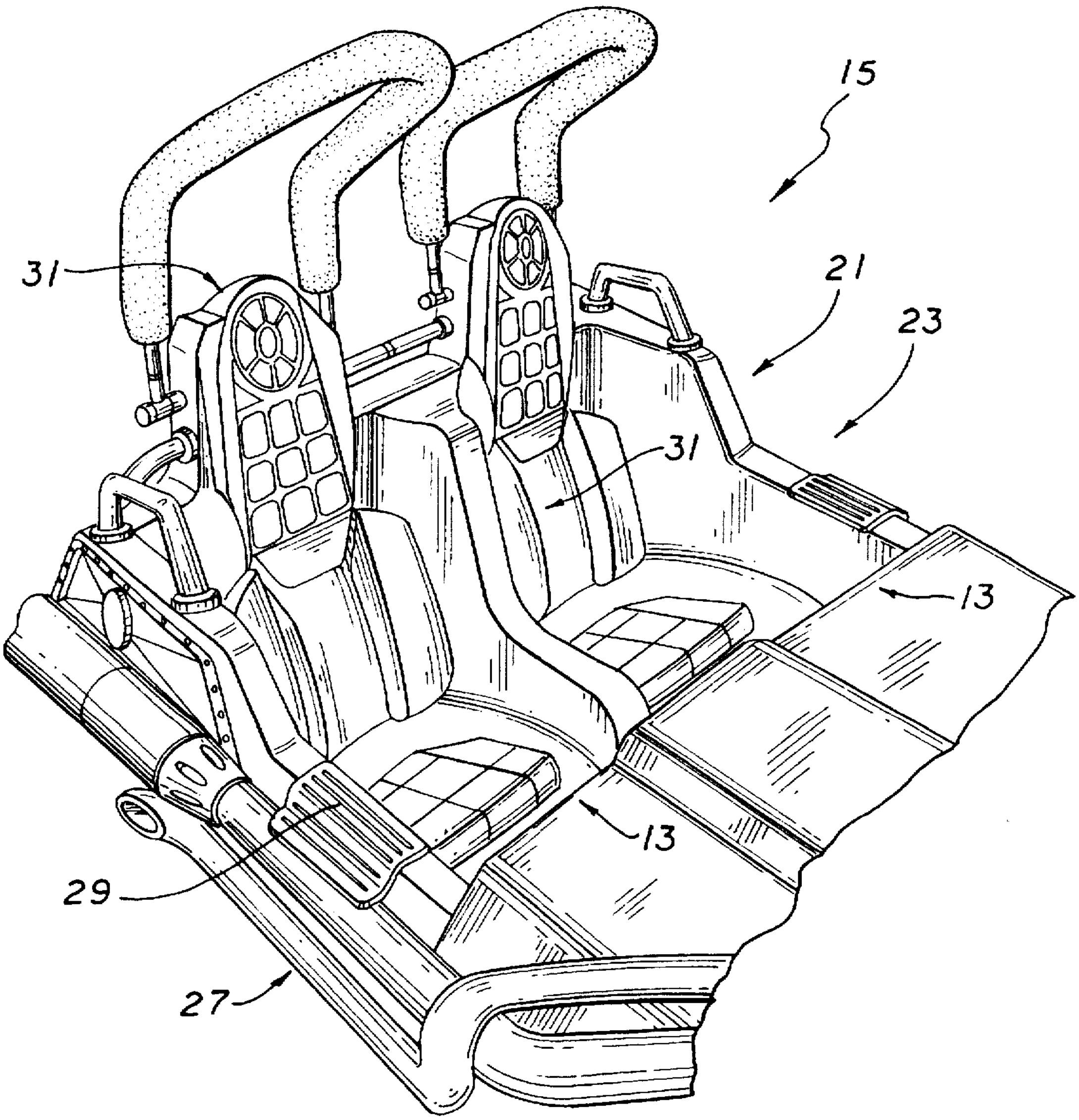
FIG. 1B is a perspective view of one of the four passenger rows of the amusement attraction ride vehicle of FIG. 1A.

FIGS. 1A and 1B represents one common amusement attraction that operates in conditions of extreme background noise, namely, a roller-coaster. As seen in FIG. 1A, a roller coaster vehicle 15 includes a 4-person front passenger section 17 and a 4-person rear passenger section 19, each of them having two rows 21 of side-by-side seats 13. The vehicle therefore carries a total of eight passengers. Although it is not illustrated in the figures, it is to be understood that the amusement attraction includes a large number of such vehicles 15, all traveling spaced apart from one another along a continuous, looped track. The track includes inclines and descents, and preferably also features show sets at various points along the track. That is to say, portions of the track include specific scenery, and some mechanism interacts between the vehicle 15 and the track to inform the vehicle when it is desired to play sounds, such as music and special effects. These sounds are generated aboard the vehicle and are acoustically produced by the sound systems 11 of each individual seat 13.

Sounds that are to be generated by the vehicle are preferably programmed in advance into an on-board computer system of the vehicle, and are stored as electronic data files in random-access memory of the computer system. The electronic data of these files are indexed by "events," and are recalled and executed as sound generation instructions by the computer system as desired. For example, track-mounted sensors are positioned at desired locations along the track, and a detector aboard the vehicle 15 detects the vehicle's passage by each track-mounted sensor. Accordingly, when the vehicle 15 encounters a first sensor, a first set of sound generation instructions is retrieved by the computer system from the memory, and when a second sensor is encountered, a second set of sound generation instructions is retrieved from the memory. Each of these instructions may call for the playing of sound effects, the starting or stopping of a particular music score, etcetera. Alternatively, "events" may be detected by sensing the presence of an infra-red marker, or they may be identified in terms of vehicle position or elapsed time of the ride. Each of these latter quantities can be measured aboard the vehicle and provided to the computer system.

Each of the vehicles travels continuously along the track, except for a brief stop at a "Wayside Station" where passengers are un-loaded, and a new group of passengers received for the next ride. From the perspective of FIG. 1A, passengers leaving the vehicle exit at its left side 23, using footrests 25 on the vehicle's left side. A new group of eight passengers may then enter the vehicle 15 from its right side 27, using footrests 29 to enter the vehicle on its right side. At this point, the vehicle 15 begins a new ride, and the computer system resets a position counter (or track-sensor counter) to zero. Preferably, multiple, alternative electronic data files are stored by the computer system, which changes its default program at the Wayside Station from one particular file to a different file, which represents a different pattern of sounds than was provided to the previous group of eight passengers. The data files each direct the computer system to play a predefined music score when the vehicle 15 is at the Wayside Station, and to change this music in a variable, but programmably-defined manner, as the vehicle begins its ride through the attraction.

It is desired to provide the eight passengers of the vehicle with a particular "ride experience." This ride experience involves not only the physical sensations experienced by passengers as the vehicle accelerates and turns, but also includes the sights and sounds the passengers are exposed to, and the overall impression imparted by the ride. To this effect, the sounds generated by the computer system contribute significantly to the ride experience. The pattern of these sounds will typically be designed to include music, played during times when the vehicle is stopped at the Wayside Station, a soundtrack which can be played continuously throughout the ride, or only at portions of it, sounds linked to external show sets, and sounds which simulate actions of the vehicle. For example, if the vehicle 15 and attraction are designed to represent travel of a spaceship, special effects can be super-imposed upon the music to represent launch, separation of rocket stages, firing of thrusters, evasion of another spacecraft, landing and other effects.

Thus, the roller-coaster vehicle 15 has sound events scripted to specific positions of the vehicle along the track, and the computer system is programmed to implement these sounds just as the vehicle reaches the specific positions. This programming is accomplished by trial and error for each electronic data file, until a library of data files is developed for the computer system which may be stored aboard each vehicle and alternatively used for each loop of the track.

II. The Sound System 11 of Each Seat

In accordance with the present invention, each passenger seat 13 of the vehicle 15 includes a specialized sound system 11 that provides stereo sound, including music and special effects. With reference to FIGS. 2 and 3, the sound system 11 includes a back rest 31 of the passenger seat 13, and left and right channel speaker sets 33 and 35, both mounted by the back rest. These speaker sets are mounted to lie on each side of the listener (i.e., the particular passenger) in a wing-back relationship, such that the speaker sets 33 and 35 point away from each other and away from the listener. Preferably, the speaker sets 33 and 35 are mounted at an angle α with respect to the back rest, such that sound is not directed directly outward, toward the next adjacent passenger, but somewhat forward. Each seat 13 also includes two lateral arms 37 and 39, one on each of the left and right sides of the listener, which are used to help reflect sound toward the listener as that will be described below.

FIG. 2 helps illustrate the layout of the sound system 11 from the front of the seat 13. Two alternative passengers are illustrated as simultaneously being seated in the seat 13, such that a large expected height difference between the passengers can be illustrated. That is, FIG. 2 helps illustrate how the present invention provides quality sound notwithstanding the height difference of the passengers. The head of a tall adult is designated by the reference letter "A," while the head of a short child is designated by the reference letter "C." Otherwise stated, it is expected that many different people, of all shapes and sizes, will ride in the vehicle 15; the extremes of these shapes and sizes is illustrated by FIG. 2.

The left channel speaker set 33 is positioned on the passengers' left, to provide sound to the passengers' left ears "A1" or "C1," whereas the right channel speaker set 35 is positioned on the passengers' right, to provide sound to the passengers' right ears "A2" or "C2." Contrary to conventional wisdom, sound from these speaker sets 33 and 35 is directed generally away from the passenger, rather than directly toward the passenger. The aforementioned angle a between each of the speaker sets 33 and 35 and back rest 31 is chosen to direct sound directly toward two spherical reflectors 41 and 43. These reflectors are convex toward the listener, such that sound emanating from each speaker set 33 and 35 will be not only reflected back toward the listener, but will be diverged upon reflection. The sound field produced by the speakers will thus be widened to cover an entire range of expected positions of the listener's head. The reflectors 41 and 43 are convex in two dimensions, such that reflected sound is diverged toward a vertical range of positions "P-1" (FIG. 2) as well as toward a horizontal range of positions "P-2" (FIG. 3).

For example, with reference to FIG. 2, sound emanates from each set of speakers within a first angle θ. Upon reflection by the spherical reflector, reflected sound diverges much more rapidly, within a second, larger angle ω. The radius of curvature and position of the reflectors 41 and 43 relative to the speaker sets 33 and 35 are chosen such that reflected sound covers the full range of positions in both of the vertical and horizontal directions ("P-1" and "P-2"). Thus, direct sound from the speaker sets 33 and 35 is not the primary sound heard by the listener, but instead, reflected sound which comes from both of the spherical reflectors forms the primary sound source. In this manner, sound of the same quality and volume is heard by the listener, notwithstanding his or her height.

Importantly, since the preferred sound system 11 is to be used in a roller coaster, it is important that the sound reflectors 41 and 43 be made of a material which is relative soft and deformable, so that it cannot hurt the passenger during the ride. To this effect, the reflectors are preferably made of a thin plastic material, naugahyde, fiberglass, etc. that is stiff, yet deformable. The material can be backed by foam, such that it yields in response to pressure, but elastically returns to its spherical shape. Notably, the reflectors 41 and 43 are mounted a sufficient distance away from passengers' head ("A" or "C") such that contact between the passengers and reflectors is not expected. However, it is nevertheless important to make the material soft and deformable to minimize any possibility that the passenger could be injured.

With reference to FIGS. 2–3, each seat 11 is composed substantially of a seat bottom 45 and back rest 31, which helps support the listener's back. The spherical reflectors 41 and 43 are mounted at a fixed position relative to these two seat elements, to thereby reflect sound toward the desired range of positions "P-1" and "P-2." Given standard variance in human height for children and adults, the lateral arms preferably mount the spherical reflectors above the seat bottom and in front of the back rest so as to provide sound across the entire desired range of positions, without positioning the spherical reflectors too close to the listener.

Figure 4:
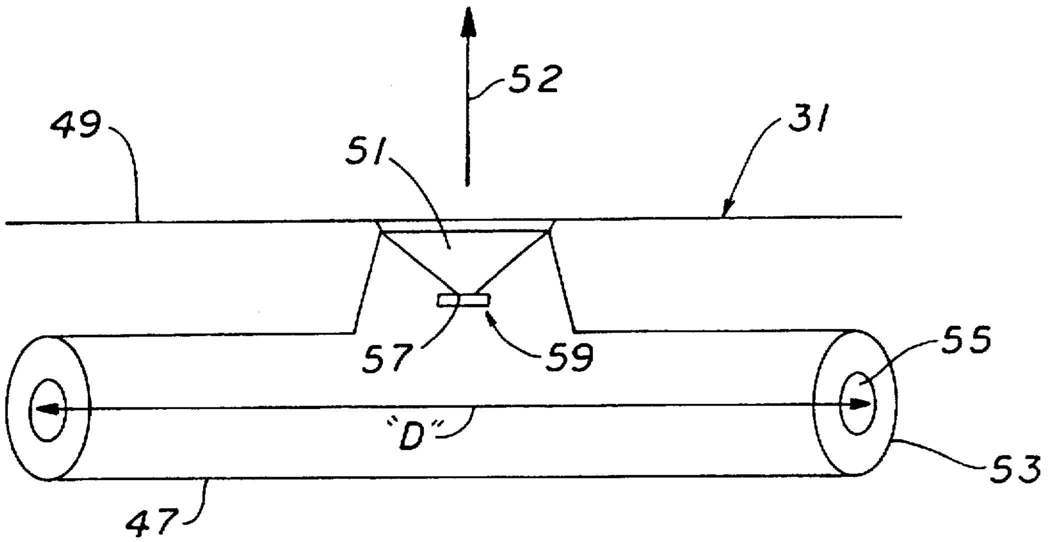
FIG. 4 is a vertical cross-sectional view of the passenger seat of FIG. 2, and illustrates the use of a common speaker enclosure for left and right channel speakers, as well as a passive driver.

With reference also to FIG. 4, the back rest 31 is partly hollow, and contains a speaker enclosure 47 that is common to both of the left and right channel speaker sets 33 and 35. That is to say, while some conventional speaker implementations use both left and right channel speakers and separate speaker enclosures, the preferred embodiment, contrary to conventional wisdom, uses the one and the same speaker enclosure 47 for both of the stereo channels. This does contribute somewhat to cross-talk for low-frequency sounds, but the small magnitude of the cross-talk is more than outweighed by the increase in bass response achieved by coupling both channels together in this manner. A top end 49 of the back rest completes the enclosure and also mounts a passive driver cone 51, which helps direct bass sounds upward along a vertical direction 52 relative to the listener.

In accordance with one aspect of the invention, this arrangement of speakers promotes production of bass sounds by the sound system, notwithstanding limited space availability in the roller-coaster vehicle 15 seen in FIGS. 1A and 1B. The passive driver cone 51 helps move air in the vicinity of the backs of the passengers' necks. Accordingly, passengers can be made to feel the hairs move on their neck to emphasize the production of certain bass sounds, and this further contributes to achieving the desired ride experience.

Figure 5:
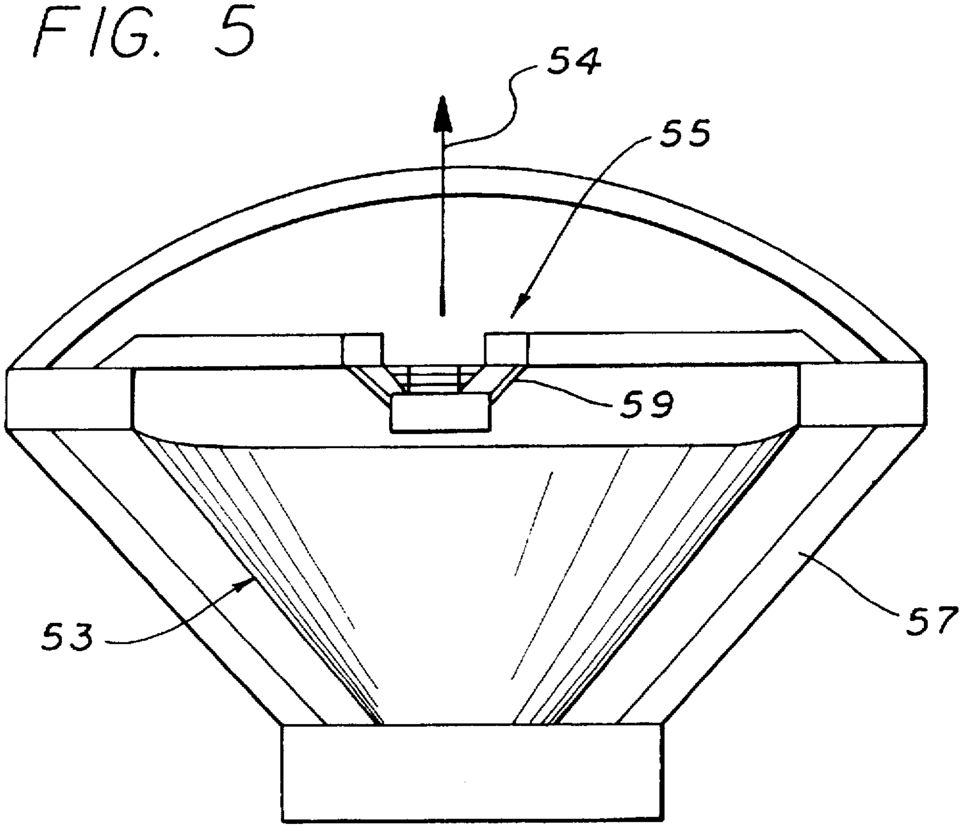
FIG. 5 shows a cross-sectional view of a coaxially-mounted, two-way speaker.

With reference to FIG. 5, each of the left and right channel speaker sets is actually two coaxially-mounted speakers 53 and 55 which emit sound in the same direction 54. A pair of spiders 57 and 59 support the speakers with the larger (low-frequency speaker) 53 of the two speakers being mounted by the back rest 31, to take advantage of the common speaker enclosure 47. By contrast, the smaller, high-frequency speaker 55 is mounted outside of the speaker enclosure 47, to minimize cross-talk between the left and right channels, which is relatively more significant for high-frequency sounds. Although not shown in FIG. 5, a standard crossover network filters an electronic signal that drives the speakers, to provide a low-frequency signal to the low-frequency speaker 53, and a high-frequency signal to the high-frequency speaker 55. The crossover network is selected such that, given the dimensions of the low-frequency speakers 53 for the two channels and of the speaker enclosure 49, the bass sounds produced by each channel may be driven in phase. The dimensions of the speaker enclosure 47 are such that the left and right channel low-frequency speakers 53 and 55 are mounted a distance "D" apart. In a preferred embodiment, the enclosure narrows down toward the middle, which potentially increases isolation between the sides at higher frequencies.

As seen in FIG. 4, the passive driver cone 51 is a sprung cone which increases the air spring in the enclosure. The sprung cone has a mass load 57 at a bottom end 59 of the cone, which produces a spring constant. These parameters are selected to produce a resonant frequency that is chosen to optimize the low-frequency response of the entire sound system 11. The driver cone 51 can also have a slightly different diameter than the cones which are being used on the sides.

What has been described is a preferred sound system 11 that is used in a roller-coaster vehicle 15. The preferred sound system 11 has been designed, not for the like production of all sound frequencies equally, but to emphasize the production of bass in a system of high background noise. Using this preferred system, high quality sound may be provided to listeners, notwithstanding height variance of the listener and notwithstanding high background noise. The present invention, however, is not limited in its application to just the environments of roller-coasters and amusement parks.

Having thus described an exemplary embodiment of the invention, it will be apparent that further alterations, modifications, and improvements will also occur to those skilled in the art. Further, it will be apparent that the present invention is not limited to use of a sound system in amusement park vehicles. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

I claim:

1. A sound system that provides sound to a human listener, wherein the human listener is of unknown dimensions, such that the position of the listener's ears may vary within a range of positions, comprising:

two speakers;

a sound reflector corresponding to each of the listener's ears, each sound reflector
  having a convex surface that reflects sound originating at a corresponding one of the speakers, and diverges that sound upon reflection, and
  being positioned relative to the corresponding ear and the corresponding one of the speakers, such that reflected sound is directed toward the range of positions;

a back rest that supports the listener; and a support mechanism for the sound reflectors that positions them proximate to the corresponding one of the listener's ears, to thereby reflect sound toward the listener's ears, the support mechanism includes two arms that extend forward from the back rest on, respectively, opposing sides of the listener's head, each arm mounting one of the sound reflectors to face generally inward, toward the listener's head.

2. A sound system according to claim 1, wherein:

the convex surface is convex in at least a vertical dimension relative to the listener, such that sound is reflected by the two sound reflectors and diverged in a vertical dimension toward the listener's ears.

3. A sound system according to claim 2, wherein:

the back rest mounts the speakers in a wing-back relationship, such that each speaker is mounted by the back rest in a manner that it directs sound generally away from the other speaker.

4. A sound system according to claim 3, wherein:

the sound system further comprises stereo driver signals including a left channel signal being provided to one of the speakers, and a right channel signal being provided to one of the speakers;

the back rest includes, in a region associated with the speakers, a central section that supports the listener, one of the two speakers being mounted on each side of the central section; and the back rest includes a speaker enclosure that is common to both of the speakers.

5. A sound system according to claim 4, wherein:

each of the speakers is a two-way, coaxially-mounted speaker and has a low-frequency speaker and a high-frequency speaker, the low-frequency speakers sharing the speaker enclosure in common and the high-frequency speakers being positioned outside the speaker enclosure.

6. A sound system according to claim 4, wherein:

the back rest also includes a passive driver coupled to the speaker enclosure.

7. A sound system according to claim 6, wherein:

the back rest includes a top section, the central section generally supporting the listener and mounting the speakers to face generally forward, the top section mounting the passive driver to emit sound in a vertical direction relative to the listener.

8. A sound system according to claim 4, wherein:

the back rest includes a head rest adjacent the speakers that supports the back of the listener's head.

9. A sound system according to claim 8, wherein:

the convex surfaces are convex along two different dimensions, such that a generally spherical surface of each reflector is used to reflect sound from the corresponding speaker.

10. A sound system according to claim 8, wherein:

the speakers are arranged to form a left channel to the left of the listener's head and a right channel to the right of the listener's head;

the speakers are positioned generally proximate to the listener's head, and for each of the left and right sides of the listener's head, direct sound in a direction generally away from the listener's head and toward a sound reflector of the corresponding arm; and sound is reflected back toward the listener's head by each of the sound reflectors, in a vertically divergent manner.

11. A sound system according to claim 1, wherein:

each of the convex surfaces is convex along two different dimensions, such that a generally spherical surface of each reflector is used to reflect sound from the corresponding speaker.

12. A sound system according to claim 1, wherein each of the speakers is a two-way, coaxially-mounted speaker.

13. A sound system, comprising:

a left channel speaker representing a left channel of stereo sound and a right channel speaker representing a right channel of the stereo sound;

a speaker enclosure that is common to both speakers; and a back rest that supports a human listener and that also forms a structural member of the speaker enclosure, the back rest having a central section that supports the listener, the speakers being mounted on either side of the central section to face generally away from each other, in a wing-back relationship;

wherein the speakers are arranged within a distance relative to one another such that they mutually reinforce production of bass.

14. A sound system according to claim 13, wherein:

the sound system further comprises a convex sound reflector for each of the listener's ears; and each sound reflector is positioned relative to the back rest and the speakers to reflect sound toward a range of positions, the range of positions being defined by a position that a listener's ears would be expected to occupy, within a variance of human height.

15. A sound system according to claim 13, wherein:

each one of the left channel speaker and the right channel speaker are two-way, coaxially-mounted speakers, and include a low-frequency speaker and a high frequency speaker;

the low-frequency speakers share the speaker enclosure in common; and the high-frequency speakers are mounted coaxial to the corresponding low-frequency speaker, but outside of the speaker enclosure.

16. A sound system according to claim 15, wherein:

the sound system further comprises a passive driver that shares the speaker enclosure with both speakers.

17. A sound system according to claim 13, wherein:

the sound system further comprises a passive driver that shares the speaker enclosure with both speakers.

18. A sound system according to claim 13, wherein:

the speaker enclosure mounts the speakers a distance apart, to face generally away from one another; and the sound system further comprises a convex reflector for each of the left channel and the right channel, each convex reflector positioned to receive sound produced by the corresponding speaker and reflect it back toward a plane normal to, and intermediate to, the distance between the speakers, to thereby disperse the sound produced by the corresponding speaker among the range of positions.

19. A sound system that permits a plurality of human listeners to each hear stereo sound, comprising:

a plurality of back rests, each one having a central section that supports a human listener;

an amusement attraction, where the back rests are positioned side-by-side, in close proximity; and a left channel speaker and a right channel speaker for each human listener, mounted on opposite sides of the central section;

wherein each of the back rests includes a speaker enclosure that is common to both of the left channel and right channel speakers;

the left and right channel speakers for each listener are mounted to face generally away from each other;

each back rest further has two lateral arms on opposing sides of the center section, the lateral arms extending forward from the back rest, one on each side of the corresponding listener; and each lateral arm has an interior side, which mounts a sound reflector that is convex to sound originating from the speaker on the same side of the center section, and is positioned to reflect sound in a divergent manner toward the one of the listener's ears, to thereby provide sound to the listener notwithstanding a variance in ear position of the listener;

whereby each listener is provided with stereo sound by at least one speaker dedicated to each of the listeners' ears.

20. A sound system according to claim 19, wherein:

each back rest has a top end;

each speaker enclosure also mounts a passive driver;

sound from the left and right channel speakers is directed generally forward in a common plane; and each passive driver emits sound in a direction that is substantially normal to the plane.

21. A sound system that permits a plurality of human listeners to each hear stereo sound, comprising:

an amusement attraction having a plurality of back rests each one having a center section that supports a human listener;

a left channel speaker and a right channel speaker for each human listener, mounted on opposite sides of the center section; and a three dimensional sound reflector for each of left and right ears for each listener, one corresponding to each of the left channel speaker and the right channel speaker;

wherein each of the left channel speaker and the right channel speaker for each listener are mounted in a wing-back relationship, such that they face generally away from one another, the reflectors for each listener are mounted on opposite sides of the corresponding center section proximate to the listener's ears, to reflect sound toward a corresponding one of the listener's ears, the reflectors each have a convex surface that diverges reflected sound toward a range of positions that is associated with a variance in the position of the corresponding listener's ears, each of the left channel speaker and the right channel speaker share a common speaker enclosure, mounted within the back rest, each back rest also mounts a passive driver that shares the speaker enclosure in common with the left channel speaker and the right channel speaker, each of the passive drivers directs sound in a substantially vertical direction relative to the corresponding human listener.

22. A sound system according to claim 21, wherein:

the sound system further comprises an amusement ride vehicle in an environment of high ambient noise; and each of the plurality of back rests forms part of a seat of the vehicle, the vehicle having a plurality of seats that are positioned side-by-side in close proximity, each seat having a corresponding left channel speaker and right channel speaker;

whereby each human listener is provided with stereo sound by a speaker pair dedicated to that listener, without cross-talk with the speakers associated with adjacent seats, and notwithstanding the high ambient noise.

23. A sound system according to claim 22, wherein:

the seats in the amusement ride vehicle are formed in a plurality of rows, each of which has a plurality of seats that are side-by-side, in close proximity.

24. A sound system according to claim 21, wherein:

each of the left channel speakers and right channel speakers, for each human listener, are two-way, coaxially-mounted speakers;

each of the two-way, coaxially-mounted speakers include a low-frequency speaker and a high-frequency speaker; and for each human listener, the low-frequency speakers for the left and right channel speakers share a common speaker enclosure while the high-frequency speakers are mounted outside of the speaker enclosure.

* * * * *

UNITED STATES PATENT AND TRADEMARK OFFICE

CERTIFICATE OF CORRECTION

PATENT NO. : 5,784,473
DATED : July 21, 1998
INVENTOR(S) : Bran Ferren

It is certified that error appears in the above-identified patent and that said Letters Patent is hereby corrected as shown below:

Title page, item [56], under References Cited, insert:

| | | |
|---|---|---|
| 5,144,670 | 09/01/92 | Negishi |
| 4,696,370 | 09/29/87 | Tokumo et. al. |
| 4,756,382 | 07/12/88 | Hudson, III |
| 3,512,605 | 05/19/70 | McCorkle |
| 5,095,506 | 03/10/92 | Kikuno |
| 4,701,951 | 10/20/87 | Kash |

Signed and Sealed this

Twenty-second Day of September, 1998

Attest:

Bruce Lehman

BRUCE LEHMAN

*Attesting Officer*

*Commissioner of Patents and Trademarks*